(12) United States Patent  (10) Patent No.: US 7,508,465 B2
Hung et al.  (45) Date of Patent: Mar. 24, 2009

(54) LCD APPARATUS WITH ELECTROSTATIC DISCHARGE PROTECTION MEMBER

(75) Inventors: San-Shan Hung, Taichung (TW); Tzong-Hsiang Lan, Kaohsiung (TW)

(73) Assignee: Qisda Corporation, Taoyuan County (TW)

( * ) Notice: Subject to any disclaimer, the term of this patent is extended or adjusted under 35 U.S.C. 154(b) by 419 days.

(21) Appl. No.: 11/322,095

(22) Filed: Dec. 29, 2005

(65) Prior Publication Data

US 2006/0146226 A1 Jul. 6, 2006

(30) Foreign Application Priority Data

Dec. 31, 2004 (TW) .............................. 093141858

(51) Int. Cl.
*G02F 1/1333* (2006.01)
(52) U.S. Cl. .............................. 349/58; 349/59; 349/60; 349/40

(58) Field of Classification Search ............. 349/58–60, 349/40
See application file for complete search history.

(56) References Cited

U.S. PATENT DOCUMENTS 5,675,396 A * 10/1997 Tsunehiro .................... 349/59
6,362,860 B1 * 3/2002 Sagawa ....................... 349/59

FOREIGN PATENT DOCUMENTS

JP 03094222 A * 4/1991

* cited by examiner

*Primary Examiner*—David Nelms
*Assistant Examiner*—Thanh-Nhan P Nguyen

(57) ABSTRACT

An electronic device of LCD (liquid crystal display) having an electrostatic discharge (ESD) protection is disclosed. In device, a shielding metal cover has two saw-like flanges formed thereon to shield the electromagnetic wave interference the related circuit and to release electrostatic discharges (ESD) and to protect LCD module from ESD attack on suddenly.

7 Claims, 1 Drawing Sheet

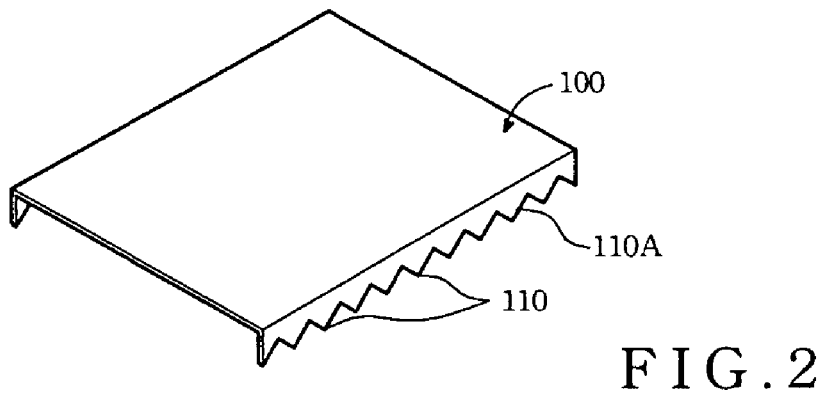
F I G . 2
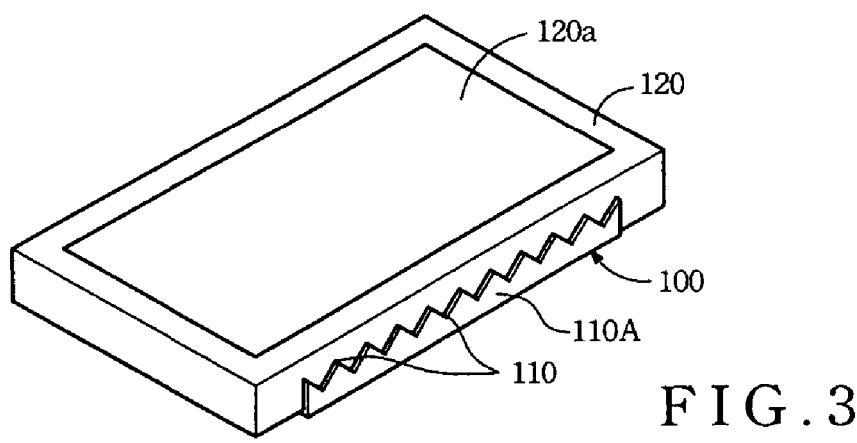
F I G . 3

LCD APPARATUS WITH ELECTROSTATIC DISCHARGE PROTECTION MEMBER

BACKGROUND OF THE INVENTION

1. Field of the Invention

The present invention is related to LCD apparatus having an ESD protection member, and particularly, to have an extra metal cover having flange designed as the ESD protection member so as to prevent the LCD modules from any ESD attack.

2. Description of the Prior Art

The phenomena of area having high electrostatic charges concentration flow to a region having low concentration or region of having opposite types is generally called electrostatic discharge (hereinafter called ESD). The display and periphery driving circuit of liquid crystal display module may be attacked or affect by an event of ESD. The ESD may cause the display to be damaged, such as the thin traces on board are melted or volatile, or resistance varies, or oxide layer is being punch-through and/or the microprocessor or controller therein runs with malfunction. ESD may be a main factor that makes the electron devise encounter electrical overstress (EOS), which often causes permanent damage to the integral circuit (IC) thereby causing the device failed.

In recent years, with the advent of consuming electronic device having various fancy features and functions become consensus and a trend for manufacturers and designers. Slim, compact, and lightweight designs have become the mainstream of the market and even the norms of the industry. With regard to mobile communication devices such as cellular phones, variety of rich tone rings and colorful displays have been considered by consumers as the very basic features. Moreover, digital camera embedded in mobile phone is no longer a rarity. To lure consumer discarding his old phone but buying a newly mobile phone, manufacturers often design phones with ergonomics and a much advertised feature. For instance, foldable cell phones embedded with digital camera of mega-pixels, or PDA (personal digital assistant) and/or MP3.

In response to the LCD display of cellular phone demanded with extreme high resolution thereby the transparent conductive traces made of indium tin oxide (ITO) is thinner and thinner. This may further weaken the ESD prevent ability. Generally, the ESD attacking ITO often comes from the seams or the joints of the mechanism, in results, the display module of the phone is damaged or program to be crashed.

In particular, to those phones having a surface lens formed on upper board thereof, the damage caused by ESD is more severe. It is due to the fringes of the surface lens usually plated with a thin metal film. While ESD invades the thin metal film, the charges attacks the ITO. Thus, to prevent the LCD module from ESD attack, the glass substrate is usually mounted with capacitors or ESD protective elements according to prior art. However, the problems, like glass brittle due to wire bonding may occur. Other conventional technique published is by mounting ESD protective elements on the flexible wire bus. However, ESD attack often be found through the ITO to the inner portion of IC. Still, another technique disclosed is by forming a droplet pattern with tips on the print circuit board (PCB) of the LCD module through patterning process.

Another prior art of about ESD prevention is disclosed by Taiwan, R.O.C., patent publication No. 541858 issued to Wintek corporation, which discloses a special ITO route. In brief, referring to FIG. 1, the ITO traces formed at contacts of IC and the glass substrate are in accordance with a special area distribution function coated beneath the IC. The ITO routes 10 are formed around the glass substrate 5 and connected with ground VSS. The reset pin is then connected in series with a resistor having high resistance. The interface is also enclosed by the VSS.

The present invention provides a newly perspective structure, with which ESD problems can be overcome but without using ESD protection devices and/or special ITO route design.

SUMMARY OF THE INVENTION

An electronic device of LCD (liquid crystal display) having an electrostatic discharge (ESD) protection is disclosed. In device, a shielding metal cover has two saw-like flanges formed thereon to shield the electromagnetic wave interfering the related circuit and to release electrostatic discharges (ESD) and to prevent LCD module from ESD attack on suddenly.

Further, the metal cover according to the present invention can also shield off the electromagnetic interference.

BRIEF DESCRIPTION OF THE DRAWINGS

The present invention will be more fully understood from the detailed description, which will be given hereinafter, with the aid of the illustrations below:

FIG. 2 shows a metal cover having flanges that have sawtooth to release the ESD so as to prevent ESD attack the LCD display module and/o shielding off electromagnetic interference in accordance with the present invention.

FIG. 3 shows an electronic apparatus, designed in accordance with the present invention, wherein the saw-tooth upward but not contact the screen of the LCD module and has its altitude lower than the screen.

DESCRIPTION OF THE PREFERRED EMBODIMENT

Figure 1:
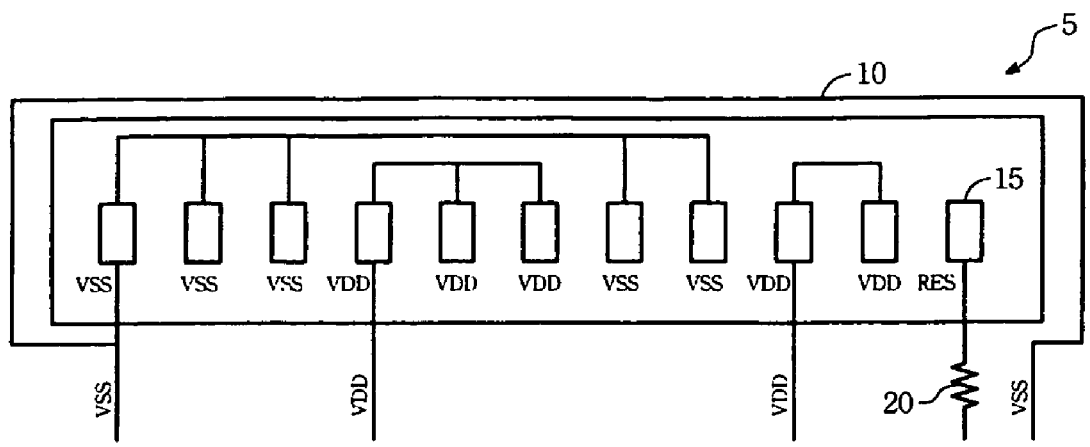
FIG. 1 shows a conventional technique for ESD protection by special ITO routine.

Conventional ESD protection for cellular phone are typically done by designed with special ITO trace route on display module, or formed with tips at the ending of the ITO traces. In a prerequisite of limited cost, the ESD prevent member according to the present invention can resolve the ESD problems and gain an extra benefit of shielding electromagnetic wave interference.

In a preferred embodiment, a metal cover (or shielding member) 100 is mounted on the rear side of the LCD module. As is shown in FIG. 2, the cover has flanges 110 at two opposite edges thereof so that it has a inverse U shape and at lest one flange 110 formed with saw-tooth e.g. a row of sharp point. Preferably, two flanges are being punched to form saw-tooth at edge thereof. In another embodiment, every edge of the rectangular cover has a flange formed thereon and with partly or all of them have saw-tooth 110a formed. The tips of the saw-tooth are toward the LCD panel 120a of the LCD module 120. The tips 110a are preferred very closed such as 0.1 mm more or less but not touch on the LCD panel and have their altitude lower than that of LCD panel, as shown in FIG. 3.

By means of tips 110a of the saw-tooth, the object of ESD protection can be approached in accordance with the basic physics. According to electric magnetic knowledge, the charge distribution on the metal surface have a relationship of $\rho_{s2}/\rho_{s1} = R_2/R_1$, where $\rho_{s2}$ and $\rho_{s1}$ are charge density of metal spheres of radius $R_1$, and $R_2$, respectively. Accordingly, charge density on the metal sphere depends on the curvature. The larger the curvature is, the higher the charge density will be. By contrast, small curvature implies that charges are sparse. In other words, the location having a larger curvature implies its electric field established will be more intense. Consequently, as the flange has tips formed, where the region will exist a strong electric field than elsewhere to destroy insulating property of the air so that any electrostatic charges will be released slowly thereby avoiding ESD damage.

For instance, as the display module of cellular phone includes a metal (iron) cover to protect ESD in accordance with the present invention, all the samples can pass our ESD tests. In one ESD test, voltage of electrostatic charges about 2 kV to 8 kV are exerted directly on the display module. In other ESD test, the voltage of electrostatic charges varies from about 2 kV to 15 kV are released through the air to the display module.

The metal cover, in aforementioned embodiment, as a whole is in metal and formed by one plastic deformation. The exemplary is for illustration only but not intended to limit the claim scope. For example, the back plate of the cover 100 can be formed of metal or non-metal but the flanges 110 must be formed of metal. Still the back plate can be a planar or have some degree of curvature. The length of the plate is not critical too as that of showing in FIG. 2.

The benefits of the invention:
1. The inverse U shape metal cover is easily formed and installed to protect the display module from being attack by ESD. No extra member or circuit design is demanded.
2. In addition to ESD protection, the inverse U shape metal cover can also be used to shielding the display module from electromagnetic interference.

As is understood by a person skilled in the art, the foregoing preferred embodiment of the present invention is an illustration, rather than a limiting description, of the present invention. It is intended to cover various modifications and similar arrangements included within the spirit and scope of the appended claims, the scope of which should be accorded the broadest interpretation so as to encompass all such modifications and similar structures.

What is claimed is:

1. An electrostatic discharge (ESD) protection member for liquid crystal display (LCD) module, said electrostatic discharge protection member comprising:
   a back plate;
   a first metal flange having at least one saw-tooth at one end and, at an opposite end, vertically connected with an edge of said back plate, said back plate and said first metal flange defining a space for housing the LCD module having a screen up, and said saw-tooth being at an upward direction.

2. The ESD protection member according to claim 1 wherein said saw-tooth has tip's altitude level thereof lower than or at most the same as the screen of the LCD module.

3. The ESD protection member according to claim 1 further comprising a second metal flange having saw-tooth vertically and in parallel to the first metal flange, connected to a second edge of the back plate.

4. The ESD protection member according to claim 3 wherein said back plate is formed of metal and thus said first metal flange, second metal flange, and said back plate, formed as a whole.

5. The ESD protection member according to claim 3 wherein said back plate is formed of non-metal.

6. An electronic apparatus, comprising:
   a LCD module;
   a metal cover having a back plate portion, a first flange portion and a second flange portion, said first flange and second flange portions having upward saw-teeth vertically mounted on an edge of said metal plate, and
   said LCD module having a screen up disposed within a space spanned by said metal cover, said metal cover shielding said LCD modules from electromagnetic interference and said upward saw-teeth being provided to prevent said LCD module from ESD attack.

7. The ESD protection member according to claim 6 wherein said saw-teeth has tip's altitude level thereof lower than or at most the same as the screen of the LCD module.

\* \* \* \* \*